United States Patent
Fuchs

(10) Patent No.: US 10,146,955 B2
(45) Date of Patent: Dec. 4, 2018

(54) SYSTEM AND METHOD FOR ACCESS CONTROL FOR DATA OF HETEROGENEOUS ORIGIN

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 7 days.

(21) Appl. No.: 13/764,477

(22) Filed: Feb. 11, 2013

(65) Prior Publication Data

US 2014/0020120 A1   Jan. 16, 2014

Related U.S. Application Data

(60) Provisional application No. 61/670,707, filed on Jul. 12, 2012.

(51) Int. Cl.
*G06F 7/04* (2006.01)
*G06F 21/62* (2013.01)
*G06F 17/30* (2006.01)

(52) U.S. Cl.
CPC .................. *G06F 21/6236* (2013.01)

(58) Field of Classification Search
CPC ......... G06F 2221/2145; G06F 21/6236; H04L 63/10
USPC .......................................................... 726/30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |

(Continued)

*Primary Examiner* — Gary S Gracia
(74) *Attorney, Agent, or Firm* — Dergosits & Noah LLP; Todd A. Noah

(57) ABSTRACT

Systems and methods are provided for controlling access to data of heterogeneous origin. A system creates combined access rights from access rights and other access rights for combined data that includes data and other data. The system receives a request to access data that is part of the combined data. The system determines whether to provide access to at least part of the data based on access rights that are part of the combined access rights. The system provides access to at least part of the data in response to a determination to provide access to at least part of the data based on the access rights that are part of the combined access rights.

12 Claims, 5 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,035,825 B1* | 4/2006 | Sturtevant ............... G06Q 30/02 705/51 |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,166,071 B1* | 4/2012 | Korablev ............... G06F 21/6218 707/783 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0124082 A1* | 9/2002 | San Andres ............ G06F 11/201 709/225 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0197871 A1* | 9/2005 | Mendonca ............ G06Q 10/107 705/7.19 |
| 2006/0059211 A1* | 3/2006 | Futatsugi ............ G06F 17/30607 |
| 2006/0161479 A1* | 7/2006 | Nashed ................ G06Q 30/02 705/14.13 |
| 2006/0173810 A1* | 8/2006 | Hom ................... G06F 21/6218 |
| 2007/0011302 A1* | 1/2007 | Groner ............... G06F 11/1076 709/224 |
| 2007/0061872 A1* | 3/2007 | Carter ................ H04L 63/0807 726/4 |
| 2008/0072276 A1* | 3/2008 | Pouliot ................ G06F 21/53 726/1 |
| 2009/0063415 A1 | 3/2009 | Chatfield et al. |
| 2009/0099895 A1* | 4/2009 | Carrier ................ G06F 21/604 705/75 |
| 2009/0164915 A1* | 6/2009 | Gasn ................ G06F 17/30893 715/753 |
| 2009/0313079 A1* | 12/2009 | Wahl .................... G06F 21/604 705/7.23 |
| 2010/0306578 A1* | 12/2010 | Thornton ............ G06F 11/1076 714/6.12 |
| 2011/0099194 A1* | 4/2011 | Trevor ................ G06F 17/30896 707/769 |
| 2011/0113058 A1* | 5/2011 | Lee .................... G06Q 10/10 707/769 |
| 2011/0173246 A1* | 7/2011 | Eschenauer ............ H04L 67/22 709/201 |
| 2011/0173270 A1* | 7/2011 | Uchida .................. H04N 7/15 709/206 |
| 2011/0271119 A1* | 11/2011 | Lin ........................ G06F 21/78 713/189 |
| 2011/0302327 A1* | 12/2011 | Prophete ............ H04L 67/1095 709/248 |
| 2012/0035942 A1* | 2/2012 | Graupner ............... G06Q 10/10 705/1.1 |
| 2012/0233209 A1* | 9/2012 | Cheng ............... G06F 17/30312 707/770 |
| 2012/0233689 A1* | 9/2012 | Korablev ............ G06F 21/604 726/17 |
| 2012/0240212 A1* | 9/2012 | Wood .................... G06F 21/33 726/10 |
| 2012/0331090 A1* | 12/2012 | Kimchi ............... H04L 67/1046 709/217 |
| 2013/0067594 A1* | 3/2013 | Kantor ............... G06F 21/6218 726/28 |
| 2013/0086685 A1* | 4/2013 | Haynes ................ G06F 21/552 726/25 |
| 2013/0173798 A1* | 7/2013 | Micucci ............... H04L 67/1044 709/225 |
| 2013/0174275 A1* | 7/2013 | Micucci ............... H04L 67/1044 726/28 |

(56) References Cited

U.S. PATENT DOCUMENTS

| | | | | |
|---|---|---|---|---|
| 2013/0317827 A1* | 11/2013 | Fu | ............... | G10L 17/00 |
| | | | | 704/273 |
| 2013/0318242 A1* | 11/2013 | Srinivasa | ............... | G06F 9/5011 |
| | | | | 709/226 |
| 2014/0068725 A1* | 3/2014 | Zhang | ............... | G06F 21/44 |
| | | | | 726/5 |

* cited by examiner

SYSTEM AND METHOD FOR ACCESS CONTROL FOR DATA OF HETEROGENEOUS ORIGIN

CLAIM OF PRIORITY

This application claims the benefit of U.S. Provisional Patent Application 61/670,707 entitled SYSTEM AND METHOD FOR ACCESS CONTROL FOR DATA OF HETEROGENEOUS ORIGIN, by Matthew Fuchs, Jul. 12, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Access Control for Data of Heterogeneous Origin

One or more implementations relate generally to controlling access to data. More particularly, it relates to controlling access to data of heterogeneous origin.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In computer security, general access control includes authorization, authentication, and access approval. A more narrow definition of access control covers only access approval, whereby a computer system makes a decision to grant or reject an access request from an already authenticated requester, based on what the requester is authorized to access. Authentication and access control are often combined into a single operation, so that access is approved based on successful authentication, or based on an anonymous access token. Authentication methods and tokens include passwords, electronic keys, and monitoring by humans and computer systems. Access approval is a function that actually grants or rejects access to requests. During access approval, a computer system compares the formal representation of an authorization policy with the access request to determine whether the request shall be granted or rejected.

Although controlling access to data may be relatively straightforward for data of homogeneous origin, such as granting a company's employee access to read some data from the company's computer system, access rights become complicated for requests to access data of heterogeneous origin, such as when the company's employee requests to read data that is a combination of the company's data and data for which the company pays a license fee to access.

Accordingly, it is desirable to provide techniques that enable a database system to control access to data of heterogeneous origin.

BRIEF SUMMARY

In accordance with embodiments, there are provided systems and methods for controlling access to data of heterogeneous origin. A system creates combined access rights from access rights and other access rights for combined data that includes data and other data. For example, a database system creates an access rights lattice that includes access rights to company X's internal data and access rights to data provided by a web-data extraction service, or web scraping service. The system receives a request to access data from the combined data. For example, one of company X's salesmen requests information about a sales lead named John Smith. The system determines whether to provide access to the requested data based on access rights that are part of the combined access rights. For example, the database system determines which John Smith data to provide to the company X salesman based on the different access rights associated with each part of the John Smith data. The system provides access to data based on the access rights that are part of the combined access rights. For example, the database system provides John Smith's title as president of Acme corporation and John Smith's email address to the company X salesman because the access rights to John Smith's title is based on web data available to the general public and the access rights to John Smith's email address is based on data available to all company X employees. However, the database system does not provide John Smith's mobile telephone number to the company X salesman because the access rights to John Smith's mobile telephone number is based on data available only to the president of company X, who did not authorize this data to be shared with all company X employees. When rights change and access to at least some data is lost, the system will attempt to use currently existing rights to reestablish access to the data. Accordingly, systems and methods are provided which enable a system to control access to data of heterogeneous origin.

While one or more implementations and techniques are described with reference to an embodiment in which controlling access to data of heterogeneous origin is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for controlling access to data of heterogeneous origin.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for controlling access to data of heterogeneous origin will be described with reference to example embodiments.

The following detailed description will first describe a method for controlling access to data of heterogeneous origin.

Next, block diagrams illustrating simplified examples of access rights lattices for controlling access to data of heterogeneous origin are described.

Figure 1:
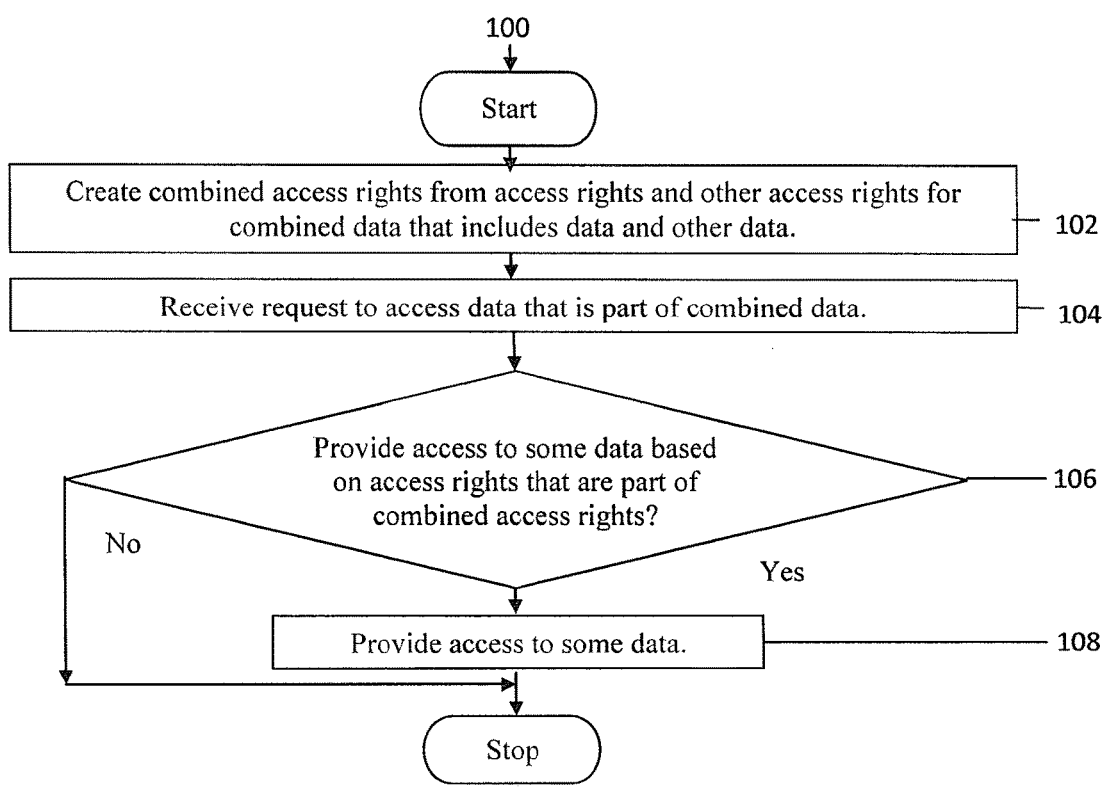
FIG. 1 is an operational flow diagram illustrating a high level overview of a method for controlling access to data of heterogeneous origin in an embodiment.

FIG. 1 is an operational flow diagram illustrating a high level overview of a method 100 for controlling access to data of heterogeneous origin in an embodiment. As shown in FIG. 1, a database system controls access to data of heterogeneous origin.

In block 102, combined access rights are created from access rights and other access rights for combined data that includes data and other data. For example and without limitation, this can include the database system creating an access rights lattice that includes access rights to company X's internal data and access rights to data provided by a web-data extraction service, or web scraping service, such as Data.com®. The combined data may be referred to a data of heterogeneous origin because this data is a combination of data from company X's internal data and data from Data-.com®. The combined access rights may also specify a time for which access is available and a potential number of access instances during this time. Simplified examples of access rights lattices are described below in reference to FIG. 2A and FIG. 2B.

In block 104, a request is received to access data that is part of the combined data. By way of example and without limitation, this can include the database system receiving a request from Bob, one of company X's salesmen, for information about a sales lead named John Smith.

In block 106, a determination is made whether to provide access to data based on access rights that are part of the combined access rights. In embodiments, this may include the database system determining which John Smith data to provide to Bob, the company X salesman, based on the different access rights for each part of the John Smith data, such as access rights to the data from company X's internal data and access rights to the data from Data.com®. If a determination is made to provide access to data, the method 100 continues to block 108. If a determination is made to not provide access to any data, the method 100 terminates.

In block 108, access is provided to data. For example and without limitation, the database system provides John Smith's title as president of Acme corporation and John Smith's email address to Bob, the company X salesman, because the access rights to John Smith's title is based on web data available to the general public and the access rights to John Smith's email address is based on data available to all company X employees, including Bob. However, the database system does not provide John Smith's mobile telephone number to Bob, the company X salesman, because the access rights to John Smith's mobile telephone number is based on data available only to Ann, the president of company X, who did not authorize this data to be shared with all company X employees, such as Bob.

The method 100 may be repeated as desired. Although this disclosure describes the blocks 102-108 executing in a particular order, the blocks 102-108 may be executed in a different order.

Figure 2A:
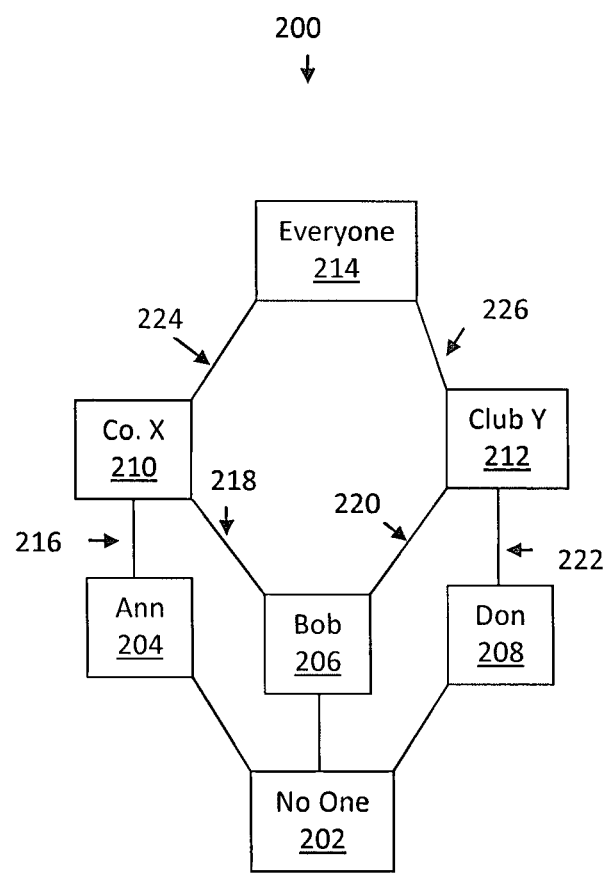
FIG. 2A is a block diagram illustrating a simplified example of an access rights lattice for controlling access to data of heterogeneous origin.

FIG. 2A illustrates a simplified example of an access rights lattice 200 for controlling access to data of heterogeneous origin. The access rights lattice 200 includes a No One node 202, an Ann node 204, a Bob node 206, a Don node 208, a Company (Co.) X node 210, a Club Y node 212, and an Everyone node 214. Although FIG. 2A depicts the access rights lattice 200 with the nodes 202-214 and with various connections 216-226 between the nodes 202-214, the access rights lattice 200 may include any number of nodes such as 202-214 and any number of connections such as 216-226 between nodes in 202-214.

The No One node 202 represents the access rights for data that no user can access, which is included in the access rights lattice 200 as a default root. The Ann node 204 represents the access rights for data that only Ann, the president of Company X, can access. The Bob node 206 represents the access rights for data that only Bob, one of the salesmen of Company X, can access. The Don node 208 represents the access rights for data that only Don can access. The Co. X node 210 represents the access rights for data that only employees of Company X can access. The connection 216 indicates that Ann, the president of Company X, has the access rights for the Ann node 204 and the access rights for the Co. X node 210. The connection 218 indicates that Bob, one of the salesmen of Company X, has the access rights for the Bob node 206 and the access rights for the Co. X node 210. The Club Y node 212 represents the access rights for data that only members of the social organization Club Y can access. The connection 220 indicates that Bob, one of the salesmen of Company X, has the access rights for the Bob node 206 and the access rights for the Club Y node 212, as Bob is a member of Club Y. The connection 222 indicates that Don has the access rights for the Don node 206 and the access rights for the Club Y node 212, as Don is also a member of Club Y. The Everyone node 214 represents the access rights for data that everyone can access. The connection 224 indicates that employees of Company X, including Ann and Bob, have the access rights for the Everyone node 214. The connection 226 indicates that members of Club Y, including Bob and Don, have the access rights for the Everyone node 214. Therefore, Ann, Bob, and Don have the access rights to data that everyone can access, such as data that is openly available via the Internet.

The database system may use the nodes 202-214 of the access rights lattice 200 and the connections 216-226 between the nodes 202-214 to determine the access rights that requesters have to data stored by the database system. For example, Bob requests the database system to provide information about a sales lead named John Smith. The database system provides John Smith's email address to Bob because the Co. X node 210 indicates that the access rights to John Smith's email address are based on data available to all company X employees, and the connection 218 between the Bob node 206 and the Co. X node 210 indicates that Bob has access rights to data available to all company X employees. The database system provides John Smith's title as president of Acme corporation to Bob because the Everyone node 214 indicates that the access rights to John Smith's title are based on web data available to the general public, and the connection 218 between the Bob node 206 and the Co. X node 214 combined with the connection 224 between the Co. X node 210 and the Everyone node 214 indicates that Bob has access rights to data available to the general public. However, the database system does not provide John Smith's mobile telephone number to Bob because the Ann node 204 indicates that the access rights to John Smith's mobile telephone number are based on data available only to Ann, the president of company X, who did not authorize this data to be shared with all company X employees, such as Bob. If Ann authorizes John Smith's mobile telephone number to be shared with all company X employees, the database system assigns the Co. X node 214 to represent the access rights to John Smith's mobile telephone number. In another example, Don, as a member of Club Y, allows anyone from Club Y to have his number. Then if Bob requests information about Don, who Ann happens to know, the system lets Bob know Don's phone number, not through Ann, but because Bob is a member of Club Y.

In the previous example, John Smith's email address is data available to all company X employees because Ann, the president of Company X has personal access to John Smith's email address and provides an open standard for authorization (OAuth) token via the database system to authorize this data to be shared with all company X employees, such as Bob. If Ann decides to leave Company X within a month, and Alice replaces Ann as the president of Company X, the database system may not be able to provide John Smith's email address to all Company X employees for either or both of two reasons. First, when Ann's authorization to share John Smith's email address expires in a month, the database system is no longer authorized to share John Smith's email address with all of the Company X employees. Furthermore, even if the database system has provided John Smith's email address to Bob before Ann's departure, people and organizations change their contact information occasionally, such that the email address that the database system previously stored for John Smith may no longer be valid when Bob requests this information.

In such a situation, the database system may take corrective measures after determining whether to provide access to the requested data. If the database system determines that the requested data is combined from heterogeneous origins, and that some of the requested data is still available, the database system may determine the minimal amount of information needed to recreate the requested data with the minimal amount of extra processing. While John Smith's title is still available as web data available to the general public, the database system no longer has authorization to provide requesters like Bob with any contact information for John Smith. Therefore, the database system may first use Bob's OAuth token to search Bob's social network contacts for information about John Smith. In this example, Bob's LinkedIn® contacts include Don, and Don's LinkedIn® contacts include John Smith, and John Smith's LinkedIn® information includes his email address. The database system uses this email address identified through the use of Bob's OAuth token to recreate the John Smith data, and provide John Smith's email address to Bob in response to Bob's request. If Bob authorizes John Smith's email address to be shared with all company X employees, the database system assigns the Co. X node 210 to represent the access rights to John Smith's email address.

Figure 2B:
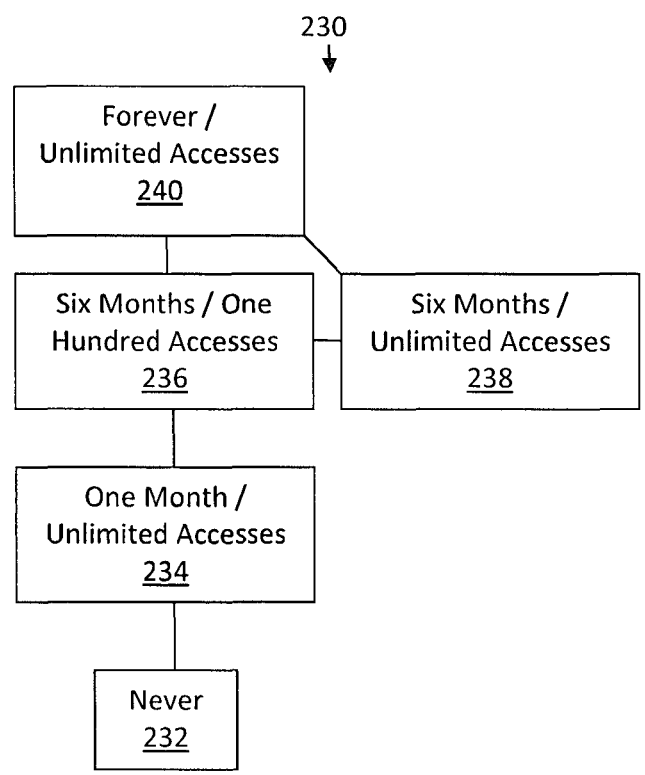
FIG. 2B is a block diagram illustrating another simplified example of another access rights lattice for controlling access to data of heterogeneous origin.

FIG. 2B illustrates another simplified example of an access rights lattice 230 for controlling access to data of heterogeneous origin. The access rights lattice 230 provides longevity information, which specifies the time that access is available to associated data. The access rights lattice 230 includes a Never node 232, a One Month node 234, a Six Months node 236, a Six Months node 238, and a Forever node 240. Although expressed as durations of time, the nodes 232-240 may also be expressed as specific dates and times. Although FIG. 2B depicts the access rights lattice 230 with the nodes 232-240, the access rights lattice 230 may include any number of nodes 232-240. The Never node 232 is included in the access rights lattice 230 as a default root. The One Month node 234 represents the access rights for data that may be accessed until a month from the current time, such as when Ann leaves as the president of Company X. The One Month node 234 also specifies an unlimited number of accesses during the month before Ann leaves. An unlimited number of accesses may be the default number of accesses for the longevity specified by database system. The Six Months node 236 and the Six Months node 238 represent the access rights for data that may be accessed until six months from the current time, such as when a subscription to a web data extraction service expires. The Six Months node 236 and the Six Months node 238 differ in that the Six Months node 236 represents data that is limited to one hundred accesses during the six months while the Six Months node 238 represents data that is not limited to any number of accesses during the six months. The Forever node 240 is the access rights for data that may be accessed indefinitely. The Forever node 240 may be the default longevity specified by database system. Whenever possible, the database system selects the least restrictive version of the requested data, the longest lived version of the requested data, and the greatest number of allowable accesses to the requested data.

The database system may use nodes of the access rights lattice 230 to determine the access rights that requesters have to data stored by the database system. For example, Bob requests the database system to provide information about a sales lead named John Smith. The database system provides John Smith's email address to Bob because the One Month/Unlimited Accesses node 234 indicates that access rights to John Smith's email address is based on data available to all company X employees for one month until Ann leaves as the president of Company X. The database system provides John Smith's title as president of Acme corporation to Bob because the Forever/Unlimited Accesses node 240 indicates that access rights to John Smith's title is based on web data available to the general public. However, the database system does not provide John Smith's mobile telephone number to Bob because the Never node 204 indicates that the access rights to John Smith's mobile telephone number is based on data available only to Ann, the president of company X, who did not authorize this data to be shared with all company X employees for any length of time, such as Bob. If Ann authorizes John Smith's mobile telephone number to be shared with all company X employees, the database system assigns the One Month/Unlimited Accesses node 234 to represent the access rights to John Smith's mobile telephone number. For this example, John Smith's email address is data available to all company X employees because Ann, the president of Company X, has personal access to John Smith's email address and provides Ann's OAuth token via the database system to authorize this data to be shared with all company X employees, such as Bob.

The access rights and the longevity for the database system form the access rights lattices 200 and 230, and their cross product, which may be referred to as an [A, L] pair, also forms an access rights lattice. The [A, L] pair may change over time, particularly the longevity component. Even though the access rights lattices 200 and 230 are highly simplified examples of lattices than would be actually used in a database system, depicting the cross product lattice between the access rights lattices 200 and 230 would be very complicated and possibly require a three dimensional depiction to be fully comprehensible. Furthermore, the database system may also use lattices for other aspects of access rights, such as the confidence in the accuracy of each stored data value, which may be an important factor when the database manager selects from multiple different data values that a web data extraction service provides to store a single data value. Likewise, the access rights, the longevity, and the confidence may form a more complex cross product, which may be referred to as [A, L, C]. The database system may use additional access rights factors as well.

System Overview

Figure 3:
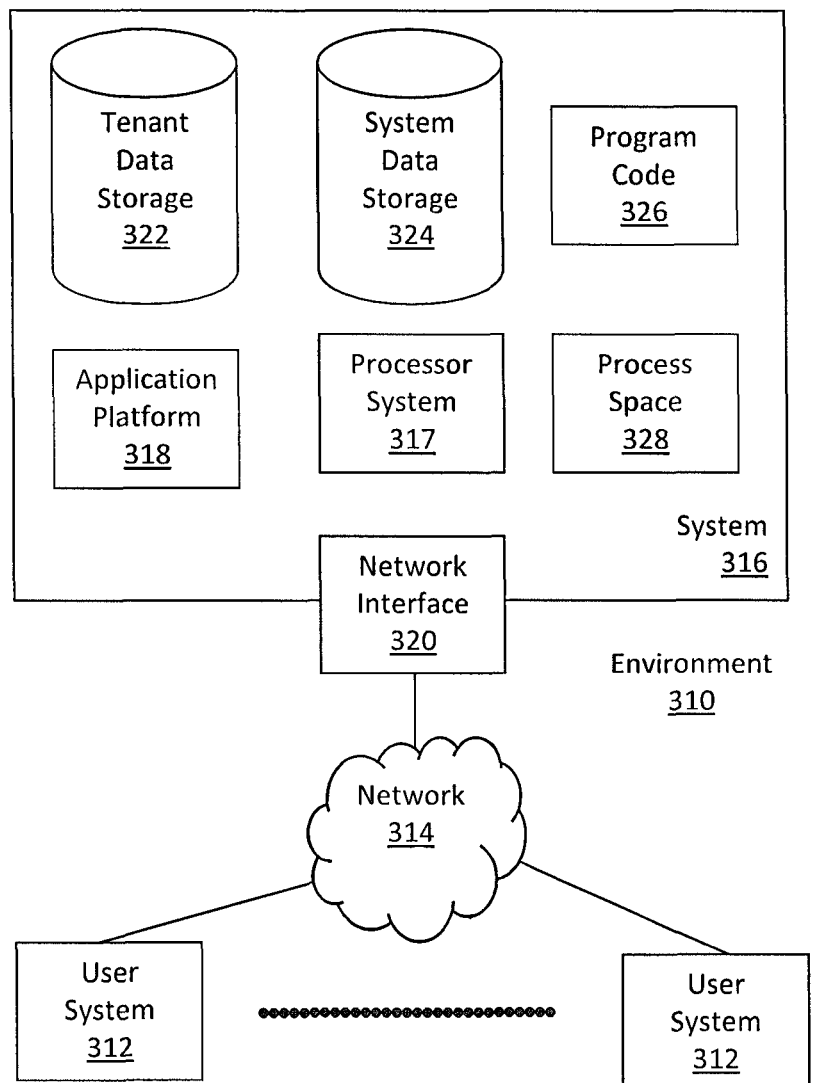
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
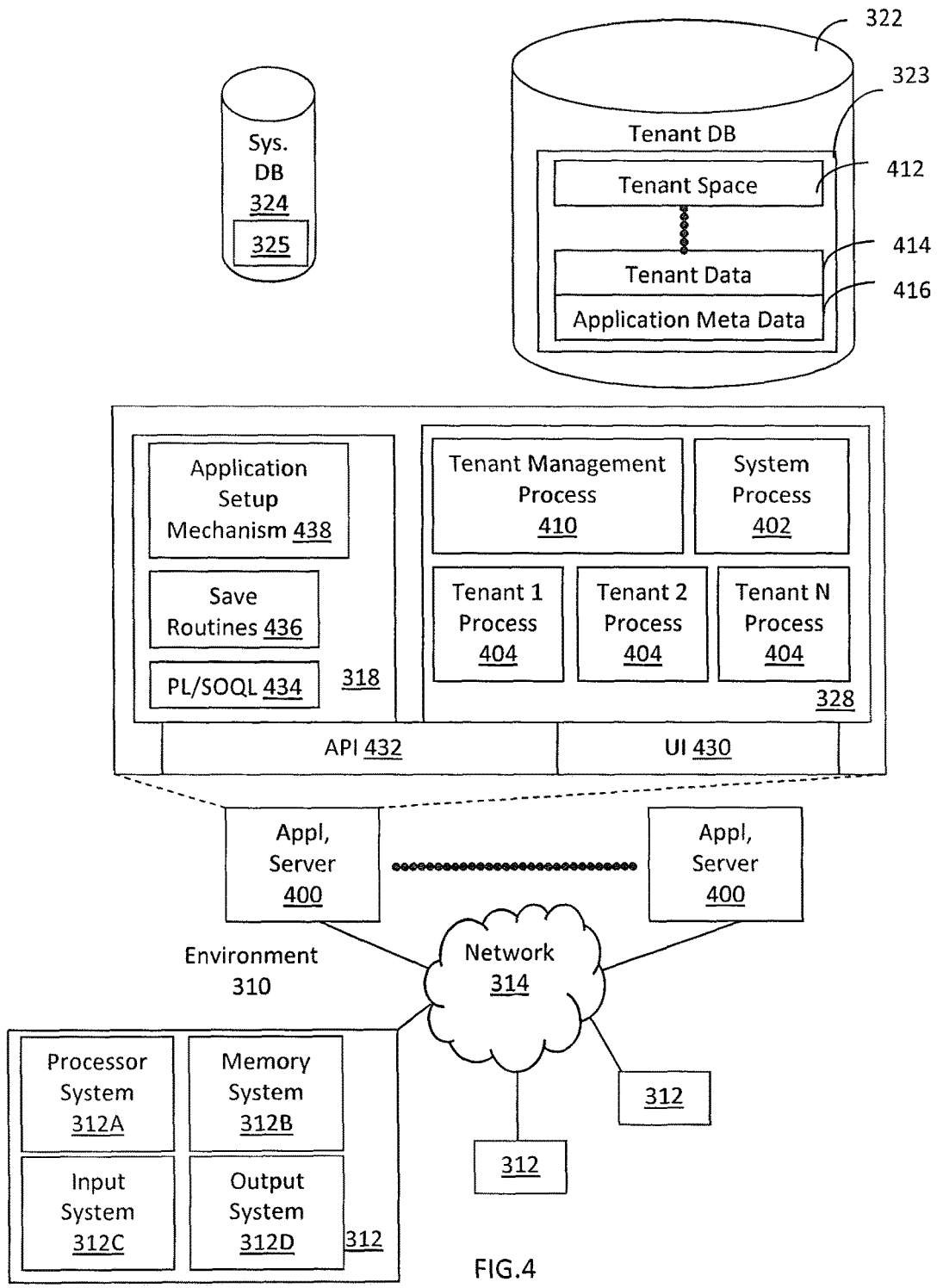
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multitenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for controlling access to data of heterogeneous origin, the apparatus comprising:
   a processor; and
   one or more stored sequences of instructions which, when executed by the processor, cause the processor to:
      create an access rights lattice for heterogeneous data comprising internal data of an organization and public web-extracted data, the access rights lattice including a plurality of internal data nodes and a public web-extracted data node, each of the plurality of internal data nodes controlling access to corresponding internal data, and the public web-extracted data node controlling access to corresponding public web-extracted data, at least one of the access rights lattice, the plurality of internal data nodes, and the public web-extracted data node comprising a time during which access is available;
      receive a request from a user to access heterogeneous data related to an entity;
      determine, based upon one or more node connections between nodes in the access rights lattice and a user node that represents access rights of the user, whether the user has access rights to an internal data portion of the requested heterogeneous data that is controlled by at least one of the plurality of internal data nodes and whether the user has access rights to a public web-extracted data portion of the requested heterogeneous data that is controlled by the public web-extracted data node;
      provide access to the internal data portion and the public web-extracted data portion of the requested heterogeneous data when it is determined, based upon one or more node connections between nodes in the access rights lattice and the user node that represents access rights of the user, that the user has access rights to the internal data portion of the requested heterogeneous data that is controlled by at least one of the plurality of internal data nodes and access rights to the public web-extracted data portion of the requested heterogeneous data that is controlled by the public web-extracted data node; and
      recreate the requested data when it is determined that the requested data may no longer be valid, the requested data being recreated using the minimum amount of information and the minimum amount of processing when it is determined that the requested data is combined from heterogeneous origins and at least some of the requested data is still available.

2. The apparatus of claim 1, wherein at least one of the access rights lattice, the plurality of internal data nodes, and the public web-extracted data node comprise a number of access instances.

3. The apparatus of claim 1, wherein providing access to the internal data portion and the public web-extracted data portion of the requested heterogeneous data comprises:

creating another combined data comprising the internal data portion and the public web-extracted data portion based on the access rights lattice that corresponds to the request to access the heterogeneous data, the other combined data comprising less of the internal data portion and the public web-extracted data portion than the internal data portion and the public web-extracted data portion; and providing access to at least a part of the other combined data.

4. A computer program product comprising computer-readable program code to be executed by one or more processors when retrieved from a non-transitory computer-readable medium, wherein the computer program product comprises a non-transitory computer readable medium, the program code including instructions to:

create an access rights lattice for heterogeneous data comprising internal data of an organization and public web-extracted data, the access rights lattice including a plurality of internal data nodes and a public web-extracted data node, each of the plurality of internal data nodes controlling access to corresponding internal data, and the public web-extracted data node controlling access to corresponding public web-extracted data, at least one of the access rights lattice, the plurality of internal data nodes, and the public web-extracted data node comprising a time during which access is available;

receive a request from a user to access heterogeneous data related to an entity;

determine, based upon one or more node connections between nodes in the access rights lattice and a user node that represents access rights of the user, whether the user has access rights to an internal data portion of the requested heterogeneous data that is controlled by at least one of the plurality of internal data nodes and whether the user has access rights to a public web-extracted data portion of the requested heterogeneous data that is controlled by the public web-extracted data node;

provide access to the internal data portion and the public web-extracted data portion of the requested heterogeneous data when it is determined, based upon one or more node connections between nodes in the access rights lattice and the user node that represents access rights of the user, that the user has access rights to the internal data portion of the requested heterogeneous data that is controlled by at least one of the plurality of internal data nodes and access rights to the public web-extracted data portion of the requested heterogeneous data that is controlled by the public web-extracted data node; and recreate the requested data when it is determined that the requested data may no longer be valid, the requested data being recreated using the minimum amount of information and the minimum amount of processing when it is determined that the requested data is combined from heterogeneous origins and at least some of the requested data is still available.

5. The computer program product of claim 4, wherein at least one of the access rights lattice, the plurality of internal data nodes, and the public web-extracted data node comprise a number of access instances.

6. The computer program product of claim 4, wherein providing access to the internal data portion and the public web-extracted data portion of the requested heterogeneous data comprises:

creating another combined data comprising the internal data portion and the public web-extracted data portion based on the access rights lattice that corresponds to the request to access the heterogeneous data, the other combined data comprising less of the internal data portion and the public web-extracted data portion than the internal data portion and the public web-extracted data portion; and providing access to at least a part of the other combined data.

7. A computer-implemented method for controlling access to data of heterogeneous origin, the method comprising:

creating an access rights lattice for heterogeneous data comprising internal data of an organization and public web-extracted data, the access rights lattice including a plurality of internal data nodes and a public web-extracted data node, each of the plurality of internal data nodes controlling access to corresponding internal data, and the public web-extracted data node controlling access to corresponding public web-extracted data, at least one of the access rights lattice, the plurality of internal data nodes, and the public web-extracted data node comprising a time during which access is available;

receiving a request from a user to access heterogeneous data related to an entity;

determining, based upon one or more node connections between nodes in the access rights lattice and a user node that represents access rights of the user, whether the user has access rights to an internal data portion of the requested heterogeneous data that is controlled by at least one of the plurality of internal data nodes and whether the user has access rights to a public web-extracted data portion of the requested heterogeneous data that is controlled by the public web-extracted data node; and providing access to the internal data portion and the public web-extracted data portion of the requested heterogeneous data when it is determined, based upon one or more node connections between nodes in the access rights lattice and the user node that represents access rights of the user, that the user has access rights to the internal data portion of the requested heterogeneous data that is controlled by at least one of the plurality of internal data nodes and access rights to the public web-extracted data portion of the requested heterogeneous data that is controlled by the public web-extracted data node; and recreating the requested data when it is determined that the requested data may no longer be valid, the requested data being recreated using the minimum amount of information and the minimum amount of processing when it is determined that the requested data is combined from heterogeneous origins and at least some of the requested data is still available.

8. The method of claim 7, wherein at least one of the access rights lattice, the plurality of internal data nodes, and the public web-extracted data node comprise a number of access instances.

9. The method of claim 7, wherein providing access to the internal data portion and the public web-extracted data portion of the requested heterogeneous data comprises:

creating another combined data comprising the internal data portion and the public web-extracted data portion based on the access rights lattice that corresponds to the request to access the heterogeneous data, the other combined data comprising less of the internal data portion and the public web-extracted data portion than the internal data portion and the public web-extracted data portion; and providing access to at least a part of the other combined data.

10. A computer implemented method for transmitting code for controlling access to data of heterogeneous origin, the method comprising:

transmitting, by a computing device, code to create an access rights lattice for heterogeneous data comprising internal data of an organization and public web-extracted data, the access rights lattice including a plurality of internal data nodes and a public web-extracted data node, each of the plurality of internal data nodes controlling access to corresponding internal data, and the public web-extracted data node controlling access to corresponding public web-extracted data, at least one of the access rights lattice, the plurality of internal data nodes, and the public web-extracted data node comprising a time during which access is available;

transmitting, by the computing device, code to receive a request from a user to access heterogeneous data related to an entity;

transmitting, by the computing device, code to determine, based upon one or more node connections between nodes in the access rights lattice and a user node that represents access rights of the user, whether the user has access rights to an internal data portion of the requested heterogeneous data that is controlled by at least one of the plurality of internal data nodes and whether the user has access rights to a public web-extracted data portion of the requested heterogeneous data that is controlled by the public web-extracted data node; and transmitting, by the computing device, code to provide access to the internal data portion and the public web-extracted data portion of the requested heterogeneous data when it is determined, based upon one or more node connections between nodes in the access rights lattice and the user node that represents access rights of the user, that the user has access rights to the internal data portion of the requested heterogeneous data that is controlled by at least one of the plurality of internal data nodes and access rights to the public web-extracted data portion of the requested heterogeneous data that is controlled by the public web-extracted data node; and transmitting, by the computing device, code to recreate the requested data when it is determined that the requested data may no longer be valid, the requested data being recreated using the minimum amount of information and the minimum amount of processing when it is determined that the requested data is combined from heterogeneous origins and at least some of the requested data is still available.

11. The method for transmitting code of claim 10, wherein at least one of the access rights lattice, the plurality of internal data nodes, and the public web-extracted data node comprise a number of access instances.

12. The method for transmitting code of claim 10, wherein transmitting, by the computing device, code to providing access to the internal data portion and the public web-extracted data portion of the requested heterogeneous data comprises:

transmitting, by the computing device, code to create another combined data comprising the internal data portion and the public web-extracted data portion based on the access rights lattice that corresponds to the request to access the heterogeneous data, the other combined data comprising less of the internal data portion and the public web-extracted data portion than the internal data portion and the public web-extracted data portion; and transmitting, by the computing device, code to provide access to at least a part of the other combined data.

* * * * *